Patented Mar. 28, 1950

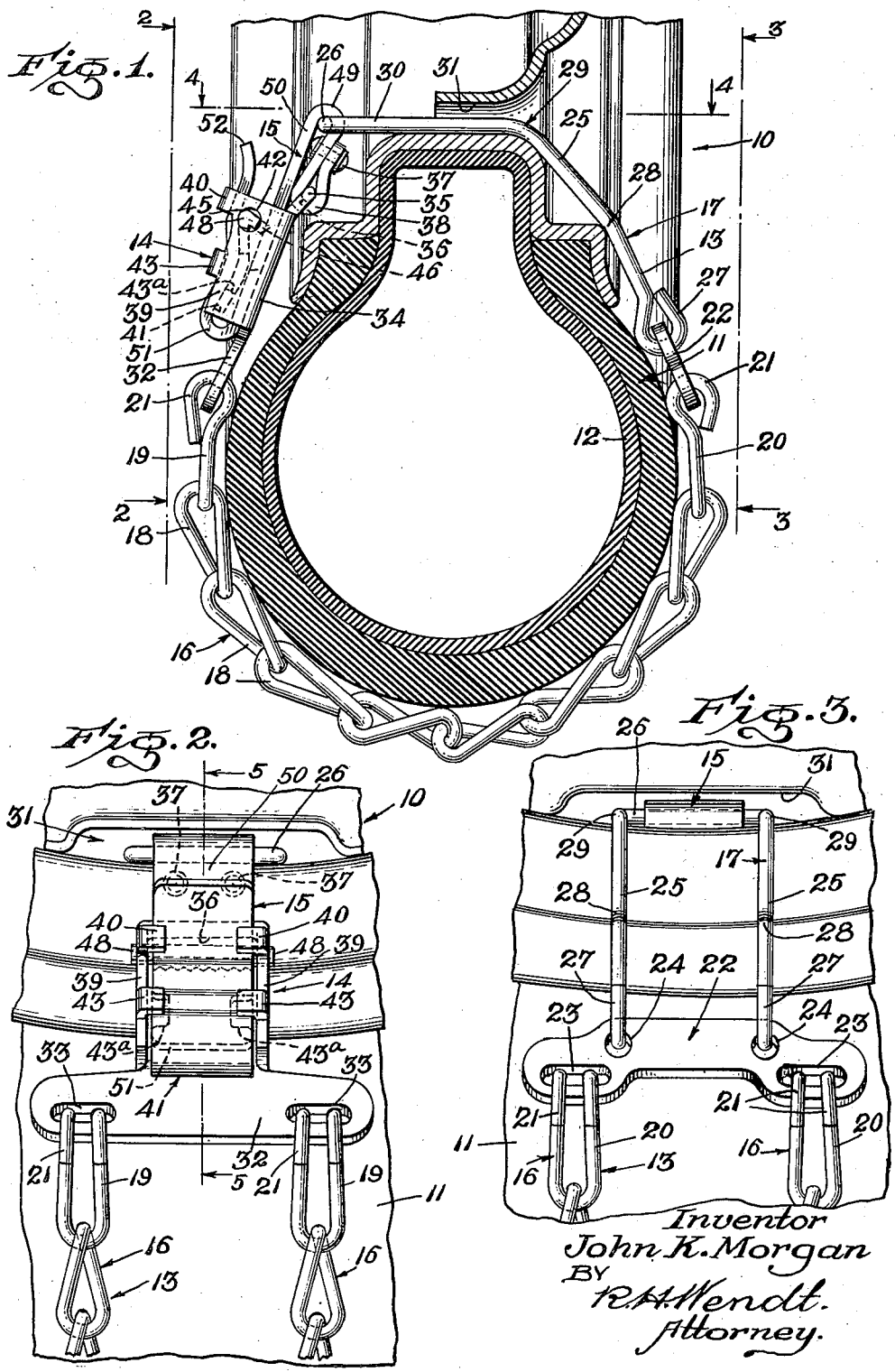

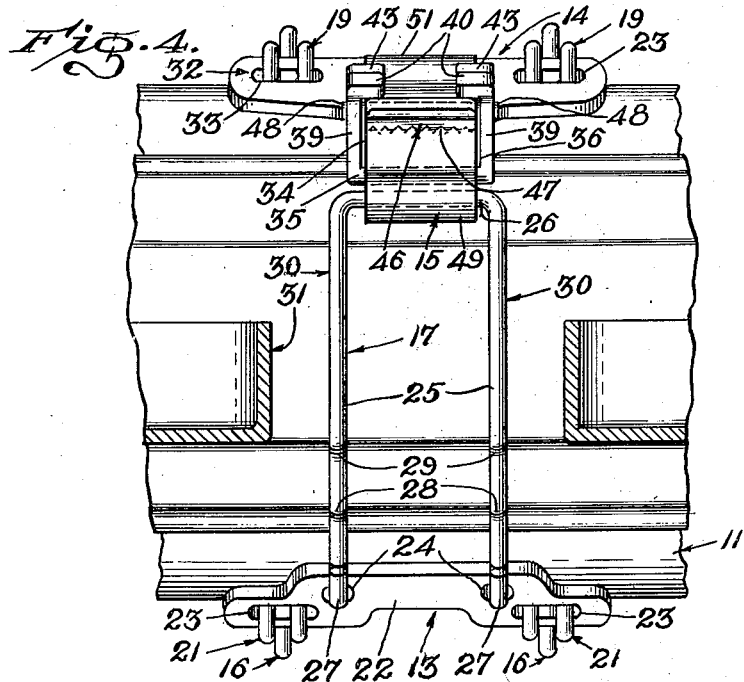
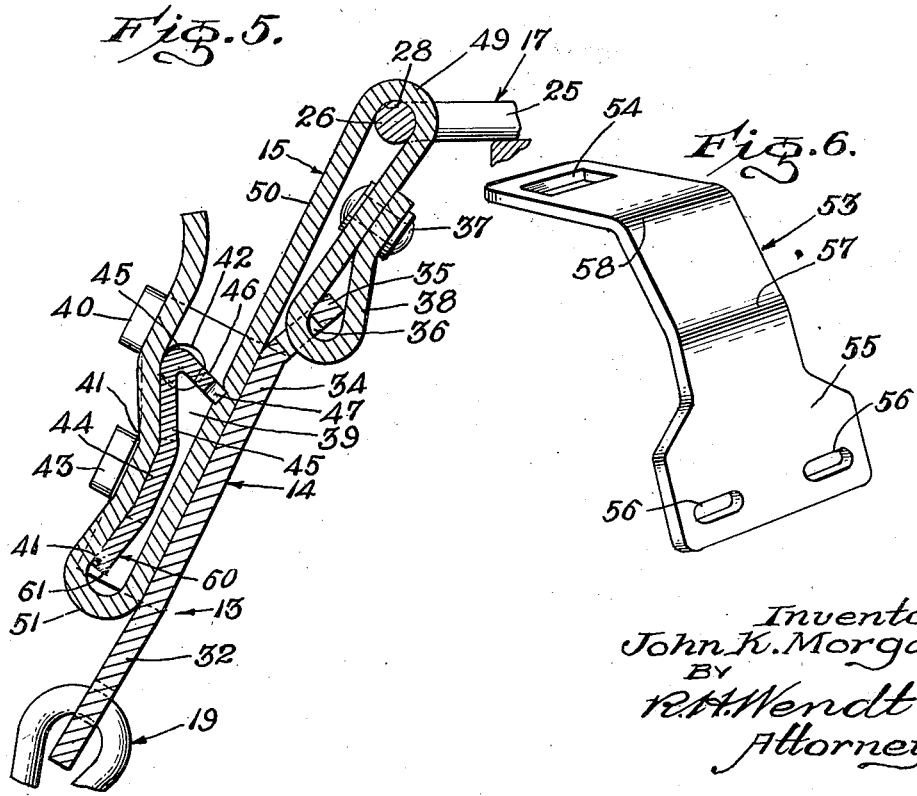

2,501,784

UNITED STATES PATENT OFFICE 2,501,784

TIRE CHAIN FOR AUTOMOTIVE VEHICLES

John K. Morgan, Chicago, Ill.

Application August 21, 1948, Serial No. 45,532

2 Claims. (Cl. 152—367)

The present invention relates to tire chains for automotive vehicles, and is particularly concerned with the individual tire chain units of the type of which a plurality may be placed on each wheel.

The tire chain units of the prior art of this type are very difficult to place on the wheel, and particularly so when the vehicle is provided with disc wheels or other metal wheels of the type having a narrow slot for receiving the securing strap which is employed on the devices of the prior art. It is practically necessary for the user to lie down beside the vehicle and to reach around the wheel to the inside of the slot, with the end of the strap in hand to insert the strap in the small slot with the devices of the prior art.

Further difficulty is entailed by the fact that the end of a strap may be frayed, thus making it difficult to insert the strap through the slot, and the strap being flexible entails additional difficulty because the strap tends to bend in the wrong direction and thus the straps are inserted only with great difficulty.

It is also true that when the need for such tire chains becomes evident the vehicle is usually stalled in the snow or mud, which increases the difficulty of attaching the chain unit.

One of the objects of the present invention is the provision of an improved tire chain unit which is so constructed that it is provided with a rigid part, curved to extend about the tire and so directed that when it is held by the user on the inside of the tire, its end will point directly at the slot in the wheel so that this rigid member may be inserted in the slot or aperture in the wheel with a minimum amount of difficulty, thus facilitating the first step in the attachment of the chain unit with relative ease.

Another object of the invention is the provision of an improved tire chain unit of the class described having such a rigid element for insertion through the slot in the wheel, in which the rigid element is so constructed that its forward end may readily be attached to the other end of the chain in such manner as to provide for firm securement, quick attachment, quick detachment, and for adjustability of the length of the chain.

Another object is the provision of an improved tire chain assembly in which the securing strap is located on the outside of the wheel so that it may be most conveniently adjusted and secured, as distinguished from the devices of the prior art in which the flexible strap extends from the inside to the outside through an aperture or slot in the wheel.

A further object of the invention is the provision of an improved buckle construction for tire unit straps in which one end of the strap is permanently secured to the buckle, the other end of the buckle supporting a chain and in which the buckle is constantly pulled into tighter engagement with the strap by the forces which are exerted upon it in the use of a vehicle.

Another object of the invention is the provision of an improved tire chain unit which is easy to apply, easy to remove, which is sturdy, simple in construction, which is adapted to be used for a long time without repair or replacement of any of its parts, and which is so constructed that it may be manufactured economically and placed on the market at a price within the means of a large number of the purchasing public.

Other objects of the invention will be apparent from the following description and the accompanying drawings, in which similar characters of reference indicate similar parts throughout the several views.

Referring to the drawings accompanying the specification of which there are two sheets, Fig. 1 is a vertical cross-sectional view taken through a tire and wheel, showing the tire chain unit in elevation as it is when applied to the wheel;

Fig. 2 is a fragmentary side elevational view taken on the plane of the line 2—2 of Figure 1, looking in the direction of the arrows and showing the outside of the tire chain unit as it appears when applied to the wheel;

Fig. 3 is a fragmentary side elevational view taken on the plane of the line 3—3 of Figure 1, looking in the direction of the arrows and showing the inside of the unit as it appears when applied to the wheel;

Fig. 4 is a top plan view of the tire chain unit applied to the wheel, this view being a horizontal section taken on the plane of the line 4—4 of Figure 1;

Fig. 5 is a fragmentary enlarged sectional view taken on the plane of the line 5—5 of Figure 2, looking in the direction of the arrows and showing the details of construction of the buckle and the mode of attachment of the strap; and Fig. 6 is a view in perspective of an alternative form of construction.

Referring to Figure 1, 10 indicates in its entirety a disc wheel which supports a tire casing 11 provided with the usual inner tube 12; and which has been provided with one of my tire chain units 13.

The tire chain unit 13 preferably includes a buckle 14, a strap 15, a length of chain 16 and a rigid attachment member 17, one form of which is shown in Figures 1 to 5. Another form of rigid attachment member 17 is shown in Figure 6.

The present tire chain unit may utilize any form of chains, and the length of chain 16, which is shown is merely exemplary of one type. Two such lengths of chain 16 are preferably employed on each unit.

The chain consists of a plurality of closed and twisted links, each end being provided with a special U-shaped link 19, 20, for attachment to the buckle 14 and to the rigid member 17. The U-shaped links 19, 20 have both their legs bent backward upon themselves, as indicated at 21 to form a loop for attachment of the chain to the adjacent parts.

The U-shaped link 20, of each chain (Figure 3) has its loops 21 attached to a sheet metal cross-head 22. This cross-head may consist of a thick strip of steel, which is provided adjacent one edge with a pair of elongated apertures 23—23. The apertures 23 are used for receiving the end of loops 21 of the U-shaped links 20. The cross-head 22 may be of any desired length, and its purpose is to space the two separate pieces of chain which it supports, as well as to provide for its attachment about the wheel. Thus the elongated apertures 23—23 are located at one edge and adjacent the ends of the cross-head 22.

Cross-head 22 is also preferably provided with a pair of round apertures 24—24, these being located adjacent the opposite edge and symmetrically situated with respect to the length of the cross-head to receive the legs 25—25 of the rigid attaching member 17. This rigid attaching member 17 is a very important element of the invention. It consists of an elongated U-shaped member which may be made of steel wire and which includes the legs 25 and the transverse yoke 26.

The length of the yoke 26 or spacing of the legs 25 is such that the strap 15 may be received between the legs 25, which preferably have a suitable clearance for easy insertion of the strap. Each leg 25—25 has its lower end, Figure 3, Figure 1, bent back upon itself to form a curved loop 27, each of which passes through an aperture 24 for pivotal securement of the rigid member 17 on the cross-head 22.

The legs 25 are preferably bent at an obtuse angle at 28 and at 29, the total amount of bend at both of these points approximating the curvature of the tire casing 11, and permitting the end portion 30 to extend horizontally when the tire chain unit is attached to the wheel, as shown in Figure 1. This curvature also permits the user to take hold of the rear end of the rigid unit 17 and to pass it about the tire casing 11 so that the yoke 26 may be easily inserted in the aperture 31 in the disc wheel 10.

As distinguished from a flexible strap, in the devices of the prior art it is relatively easy to pass the rigid member 17 about the inside of the tire casing and wheel until it is inserted and passed through the aperture 31. The length of the end portion 30 is preferably such that the yoke 26 is located outside of the wheel at such a point that the buckle 14 may rest against the side of the rim and the tire casing 11.

Referring to the other end of the assembly, shown in Figures 1 and 2, this end is preferably provided with both the buckle 14 and the strap 15 so that both these elements will appear on the outside, that is the left, of the wheel in Figure 1, where they can be manipulated most easily.

The buckle 14 may consist of a sheet metal member, such as a steel plate, which has its lower end formed with an integral cross-head 32. This cross-head is of the same length as the cross-head 22, and is provided with similar elongated apertures 33 within which the end links 19 are pivotally secured by having their legs passed through the apertures 33 and bent backward upon themselves to form the closed loops 21. Thus the left end of each chain is secured to the buckle 14.

The buckle 14 may have an integral substantially rectangular body 34, Figure 1, the upper end of which has a strap securing extension 35 which is provided with an elongated aperture 36 for receiving the strap 15. The strap 15 is passed through the aperture 36 and bent back upon itself and secured by means of a plurality of rivets 37 to form a closed loop 38. Thus one end of the strap 15 is secured to the upper end of the buckle 14.

The buckle body 34 preferably has a pair of integral outwardly projecting side flanges 39, 39, which extend at right angles to the body 34 and which may be seen in side elevation in Figure 1. These side flanges 39 preferably support at their upper end, in Figure 5, a pair of inwardly extending lugs 40, located upwardly beyond the pivoted member 41 of the buckle and adapted to receive the end of the strap 15.

The side flanges 39 are also provided, substantially midway of the pivotal member 41, with another pair of inwardly projecting flanges 43, which are located to extend above the backwardly turned strap 15 when it is folded back at 51 over the pivotal member 41. The strap retaining flanges 40 being located beyond the bearings 42, do not interfere with the pivotal movement of the buckle member 41, but in order to pass the flanges 43 the body of the buckle pivotal member 41 is preferably cut away at 43a on each side so that the buckle pivotal member 41 can pivot up past the flanges 43.

The strap, however, being of full width of the buckle it will not pass the retaining flanges 43, and when inserted under the retaining flanges 43 will insure the retention of the pivotal member 41 in the closed position of Figure 5.

The side flanges 39 are provided at the upper end of the buckle with a circular aperture 42, serving as bearings for the pivotal member 41 of the buckle. The body 34 of the buckle is preferably made of sufficient width to receive the strap 15. Body 34 of the buckle is preferably bent outward at an obtuse angle at 60 so that the end 61 of this body projects outwardly at an angle from the body of the buckle 14 in such manner that either the fingers or a tool, such as a screw driver, may be inserted under it to pry the buckle open.

The body 44 of the pivotal member 41 is bent at an acute angle at 45, forming a securing flange 46, which extends inward in Figure 1 toward the strap 15 which it engages.

The securing flange 46 of the buckle may be provided with a plurality of teeth 47. The securing flange 46 is preferably as wide as the strap 15, occupying the full width of the inside of the buckle 14, and the pivotal member 41 is preferably provided with a pair of trunnions 48, Figure 2, located substantially at the bend 45. The trunnions 48 may comprise laterally projecting integral tongues of substantially the same width as the aperture 42 in which they rotate as trunnions in a bearing.

The length of the securing flange 46 is such that when the trunnions 48 engage the left side of the aperture 42, Figure 5, there is less room between the teeth 47 and the body 34 of the buckle than the thickness of the strap 15. Thus the teeth 47 bite into the strap when the pivotal member 41 is rotated counter-clockwise to the position of Figure 5.

The acute angle at the point 45 is provided to make the securing flange 46 of the buckle extend in such direction that a further pull on the strap tends to draw the teeth 47 more deeply into the strap.

The strap 15 extends from its loop 38 upward through the rigid member 17 about the yoke 26, where it is bent downward at 49 with a hairpin bend to extend through the buckle 14. The portion 50 of the strap 15 passes through the buckle to the lower end of the buckle, and is bent backward again with a hairpin bend at 51 below the buckle.

From the bend 51 the strap 15 passes upward under the retaining flanges 43, 40 above the pivotal member 41 of the buckle. The strap 15 being wider than the body 44 of the pivotal member 41, the pivotal member 41 of the buckle cannot come loose as long as the strap end portion 52 lies under the retaining flanges 43.

Referring now to Figure 6, this is a view in perspective of an alternative form of the rigid element 17, which has been indicated by the numeral 53. This element 53 replaces both the rigid element 17 and the cross-head 22 of Figure 1. Rigid member 53 may consist of a strap of steel of sufficient width to have a rectangular aperture 54 for passing the strap 15.

Aperture 54 is located at the left or advance end of the rigid member 53. At its other end rigid member 53 may be provided with a widened portion 55 serving as a cross-head, and having the elongated apertures 56 like the apertures 23 in the cross-head 22. Apertures 56 may thus serve to receive the loops 21 of the end links 20 of the two chains.

Rigid member 53 is preferably made of a plate of sheet steel and is provided with obtuse bends at 57 and at 58, like the bends 28 and 29 in the rigid member 17 and for the same purpose. The mode of application of my tire chain unit is as follows:

The user should preferably stop the car at such a point that the wheel aperture 31 is located above the ground and below the tip of the fender. Then the user may sit upon his haunches behind the wheel, assuming it is a rear wheel, and he may take the rigid member 17 in his hand, holding the rest of the chain in an untwisted condition in his other hand.

Assuming he is applying the chain to a rear left wheel, the user may then pass the rigid member 17 about the tire casing 12, on the inside, with the yoke 26 advancing toward the hole 31 in the wheel as the rigid member passes about the inside of the tire.

The curvature of the rigid member 17 or 53, as the case may be, is such that if this rigid member is held against the side of the tire, the yoke 26 will point toward the hole 31 through which it may be inserted until it is exposed on the outside of the wheel, as shown in Figure 1.

Then the left hand is used to insert the strap 15 inside the yoke 26, and the strap is pulled downward to form the bend 49, after which the operator may release the rigid member 17 which has been held by the right hand up to this time. Turning then to the outside of the wheel, the operator may then pass the end of the strap 15 between the pivotal member 41 and the body 34 of the buckle, this being done while the pivotal member 41 is turned with its securing flange 46 parallel to the body 34 of the buckle; thus presenting a relatively wide slot through which the strap may be inserted with ease below the pivotal member 41.

The strap is then pulled tight and the pivotal member 41 is pivoted in a counterclockwise disection downward toward the body 34. This will automatically give the strap the amount of looseness which it should have. The pull on the strap and on the securing flange 46 of the pivotal member 41 is such as to pull the buckle constantly into tighter engagement with the strap, the teeth 47 biting into the strap. As further insurance against the buckle coming loose the strap 15 has its extreme end portion 52 passed backward underneath the securing flanges 43 of the buckle.

These flanges 43 engage outside the strap and prevent the pivotal member 41 from moving to open position until the strap has first been pulled out from under the flanges 43.

The operation of my tire chain unit after it has been applied is substantially the same as any other chain unit. My chain unit is, however, much easier to apply and to adjust on the tire than any of the devices of the prior art. By means of the rigid member 17 or 53, it is a simple matter to insert that end of the chain unit through the aperture 31. Thereafter all of the adjustments that are to be made are on the outside of the tire and wheel, and the strap may be fastened very easily.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a tire chain for automotive vehicles, a sheet metal cross bar provided adjacent each end with an elongated aperture for chain attachment and a round aperture, a substantially rectangular U-shaped wire member having its legs formed with closed loops passing through said round apertures, said U-shaped member being bent laterally to point through a wheel aperture, when its legs are held about a curved tire assembly on the wheel, said legs being spaced by a straight integral wire yoke of sufficient length to engage a strap, a sheet metal buckle body having a cross bar with elongated apertures near its ends, a pair of chains having their ends secured in said elongated apertures, said buckle body having a central elongated strap aperture at its other end, a strap having one end secured in said latter aperture and passing through said U-shaped member, and a clasp pivotally carried by said body and having teeth engaging said strap, the clasp extending along said body away from said U-shaped member so that the pull on said teeth moves said clasp into closer engagement with the strap.

2. A tire chain according to claim 1, in which the buckle body is provided with inwardly turned flanges spaced from the clasp by the thickness of the strap for engaging the strap when backwardly turned over said clasp and under said flanges.

JOHN K. MORGAN.

REFERENCES CITED

The following references are of record in the file of this patent:

UNITED STATES PATENTS

| Number | Name | Date |
| --- | --- | --- |
| 2,453,426 | Freed | Nov. 9, 1948 |
| 2,080,636 | Stahl | May 18, 1937 |
| 2,203,270 | O'Brien | June 4, 1940 |
| 2,420,804 | Wenzel | May 20, 1947 |
| 2,453,426 | Freed | Nov. 9, 1948 |